Oct. 25, 1927.

E. R. BARRETT

ELEVATING DUMPING APPARATUS

Original Filed March 24, 1924    6 Sheets-Sheet 1

1,646,679

Inventor
Edward R. Barrett.
By Frank E. Liverance, Jr.
Attorney.

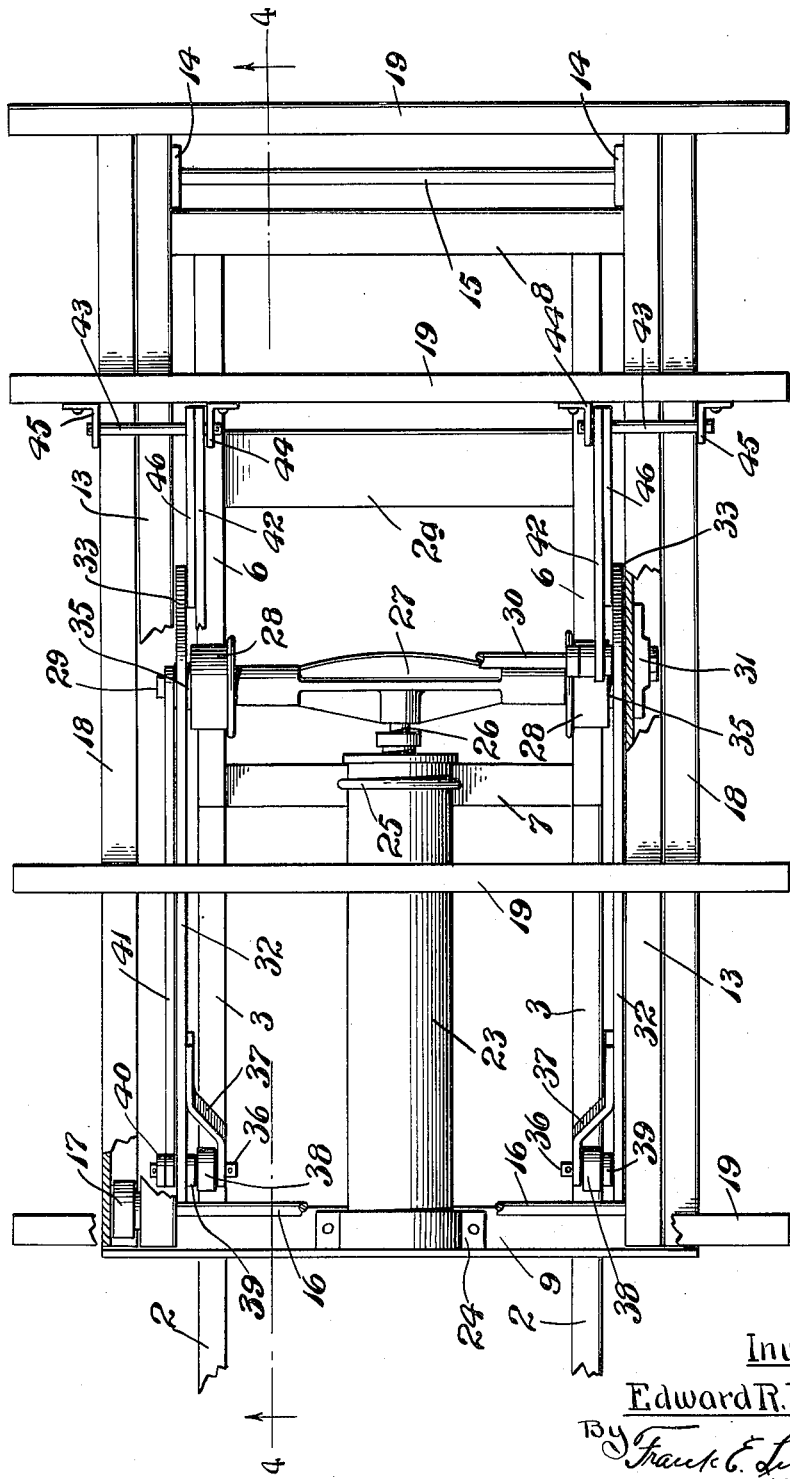

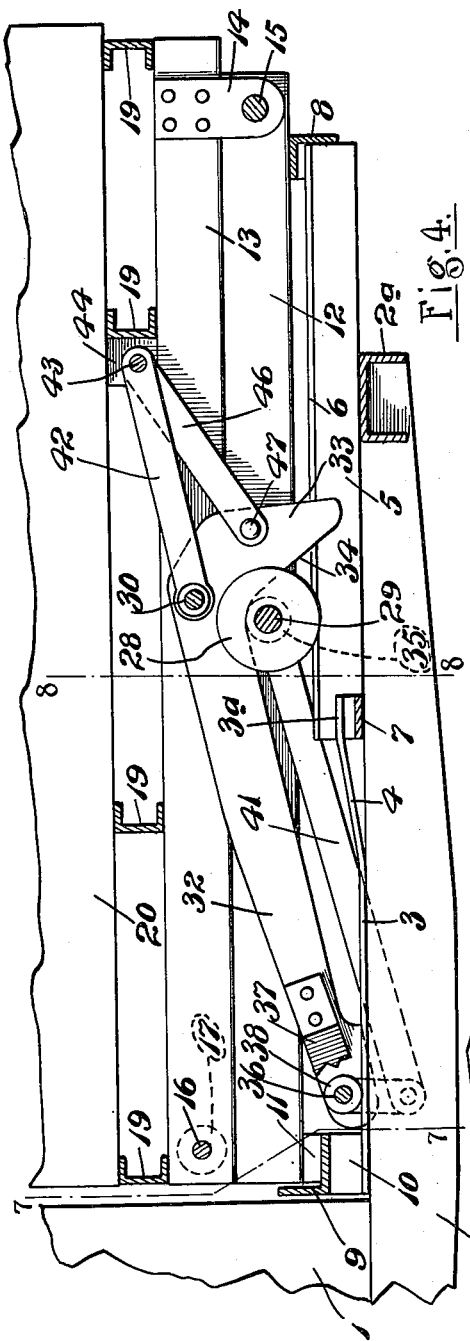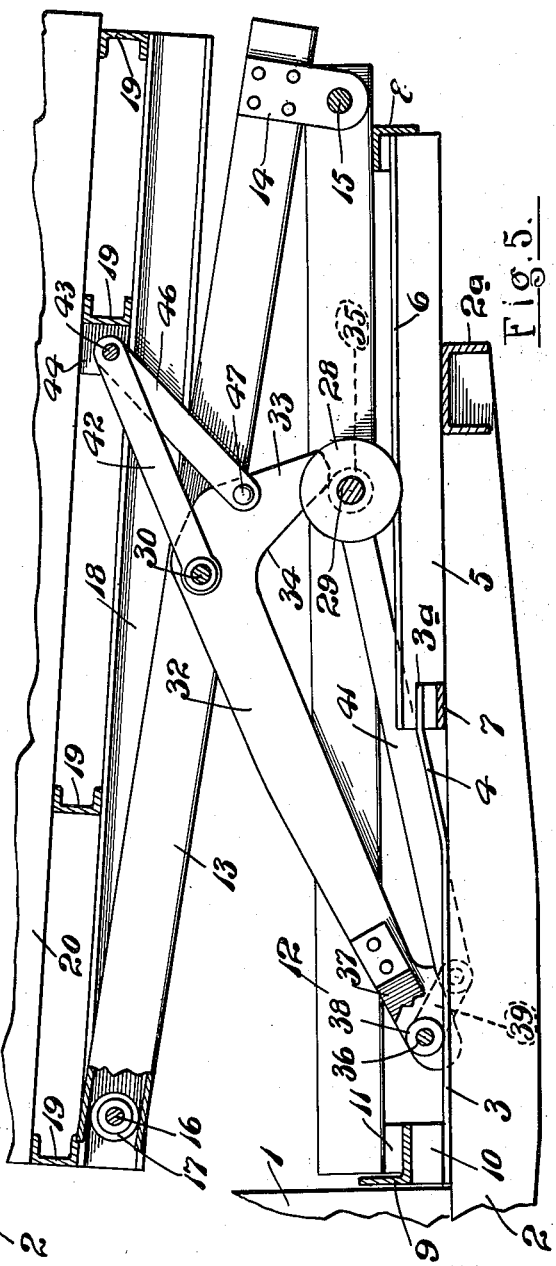

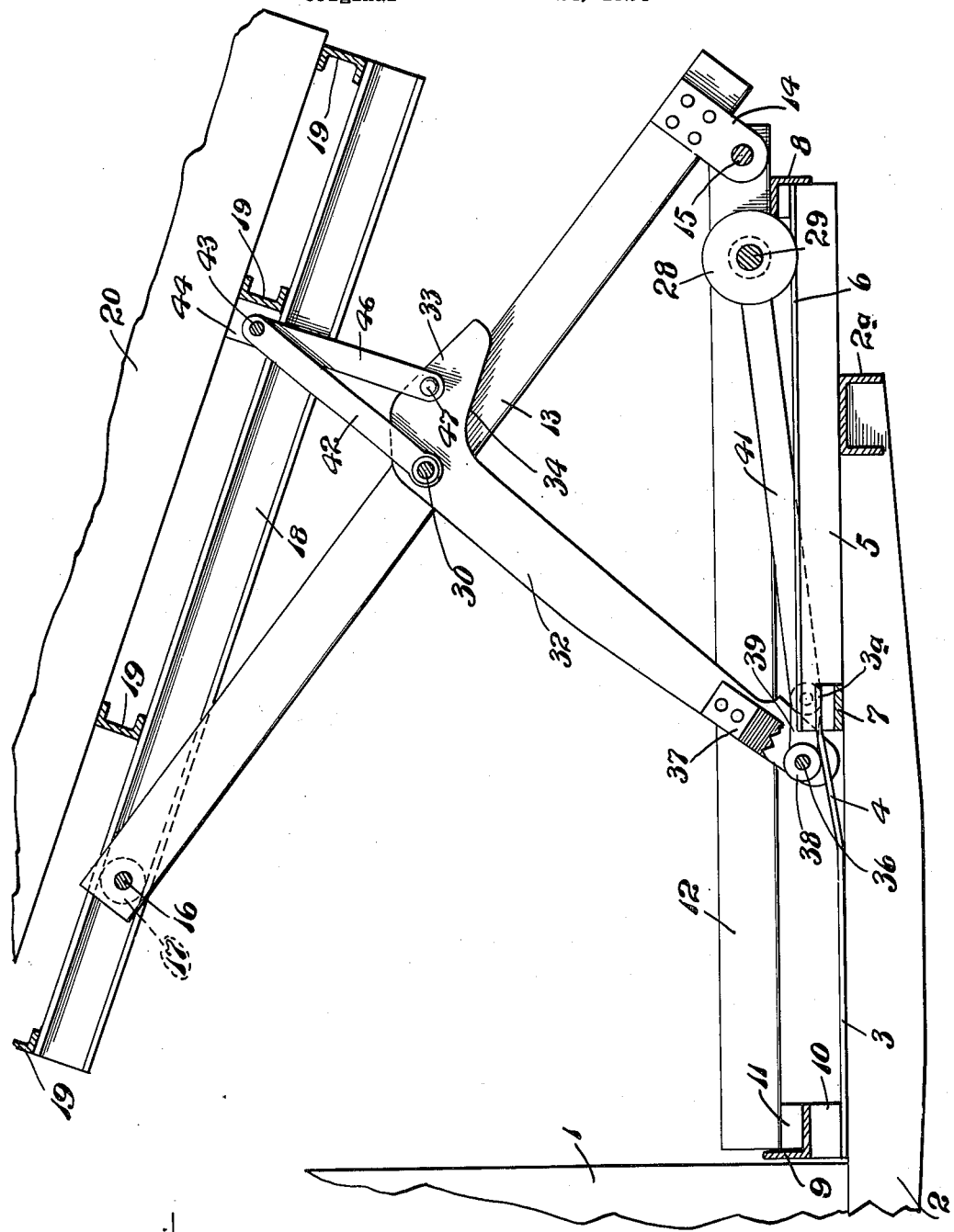

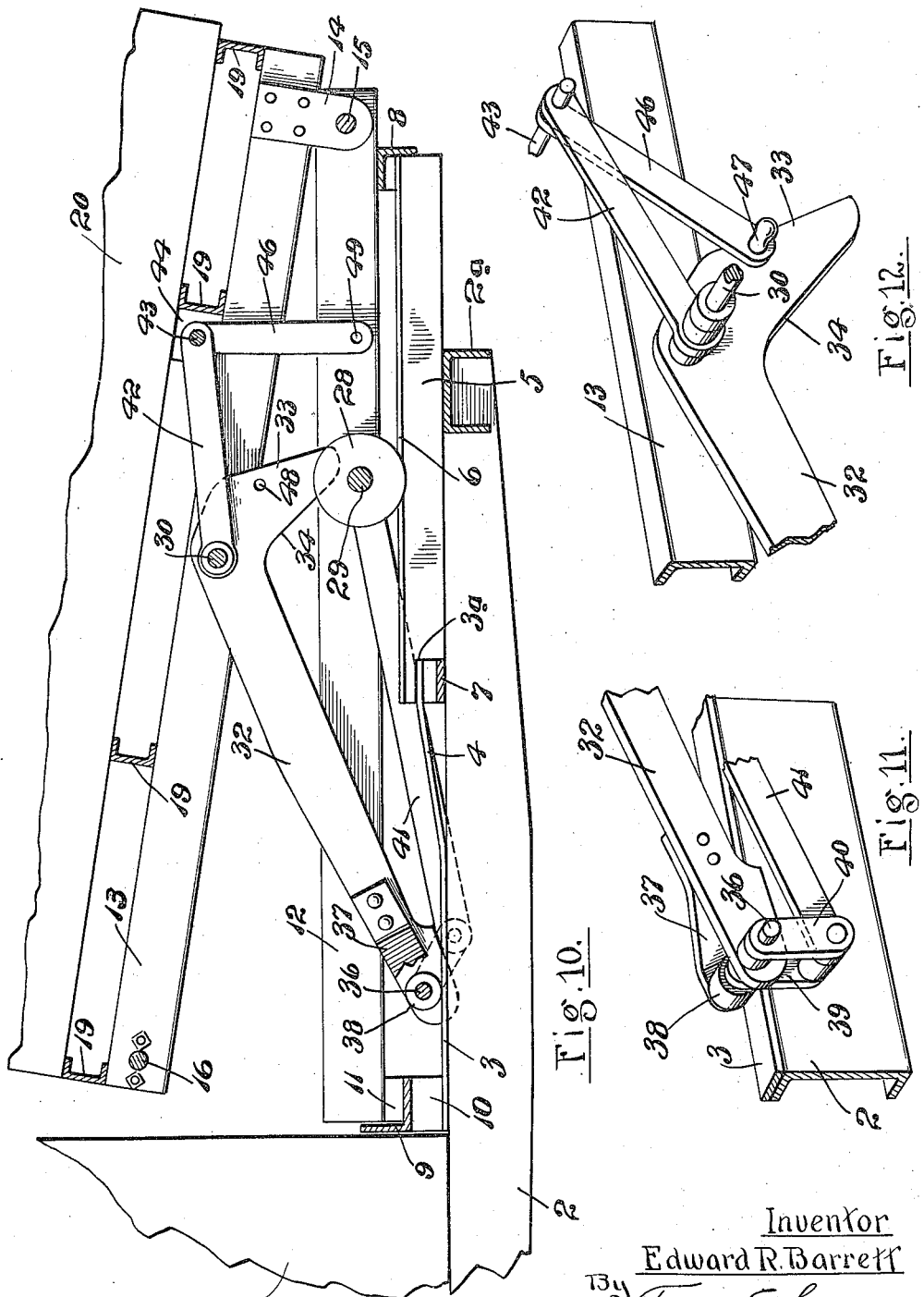

Patented Oct. 25, 1927.

1,646,679

UNITED STATES PATENT OFFICE.

EDWARD R. BARRETT, OF DETROIT, MICHIGAN, ASSIGNOR TO WOOD HYDRAULIC HOIST AND BODY COMPANY, OF DETROIT, MICHIGAN, A CORPORATION OF MICHIGAN.

ELEVATING DUMPING APPARATUS.

Application filed March 24, 1924, Serial No. 701,264. Renewed August 19, 1927.

This invention relates to a means for tilting a body carried on a truck so as to automatically dump the contents from the body at the rear end thereof, coupled with means for elevating the body and its contents to a higher plane than it normally occupies. This last feature of dumping bodies carried on trucks is desirable in many instances, particularly in dumping coal from the body, said body being required to be elevated as a whole to considerable height that the shute carrying the coal from the body to the cellar or other place of destination may have sufficient inclination that the coal will run down the same freely.

The invention comprises many novel features of construction and combinations and arrangements of parts whereby the body may be mounted on a truck for either the usual tilting dumping of its contents, or a tilting dumping thereof coupled with an elevation of the body to a higher plane as a whole, a very simple connection being used for changing from one to the other. In addition, the construction is designed so that the elevation and tilting of the body shall not carry the load to the rear whereby an overbalancing of the truck might occur, the center of gravity of the load always being to the front of the plane of the points of contact of the rear wheels of the truck with the ground. And in general, many novel constructions are used for the effective attainment of the ends set forth, all of which will appear as understanding of the invention is had from the following description, taken in connection with the accompanying drawings, in which, Fig. 1 is a side elevation of a motor truck equipped with a dumping body mounted for tilting and elevating movements, the body being shown in lower horizontal position.

Fig. 3 is an enlarged plan view of the mechanism used for mounting and tilting and elevating the body, certain parts being broken away and shown in section for better disclosure of structure.

Fig. 4 is a vertical section substantially on the plane of line 4—4, Fig. 3, the body being in lower horizontal position.

Fig. 5 is a like section showing the position of the parts substantially at the completion of the first stage of the tilting and elevating movement of the body.

Fig. 6 is a like section showing the position of the parts at the final stage of the elevating and tilting movement of the body.

Figure 1:
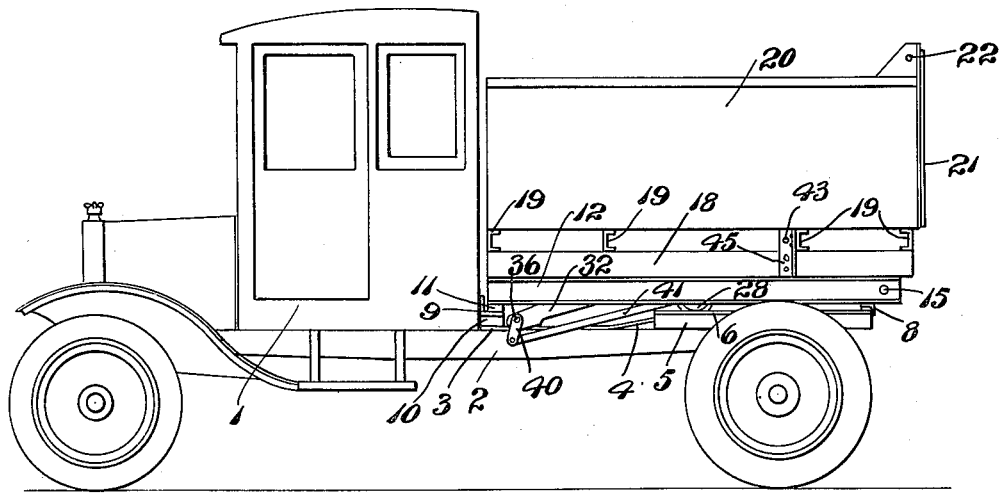
Figure 2:
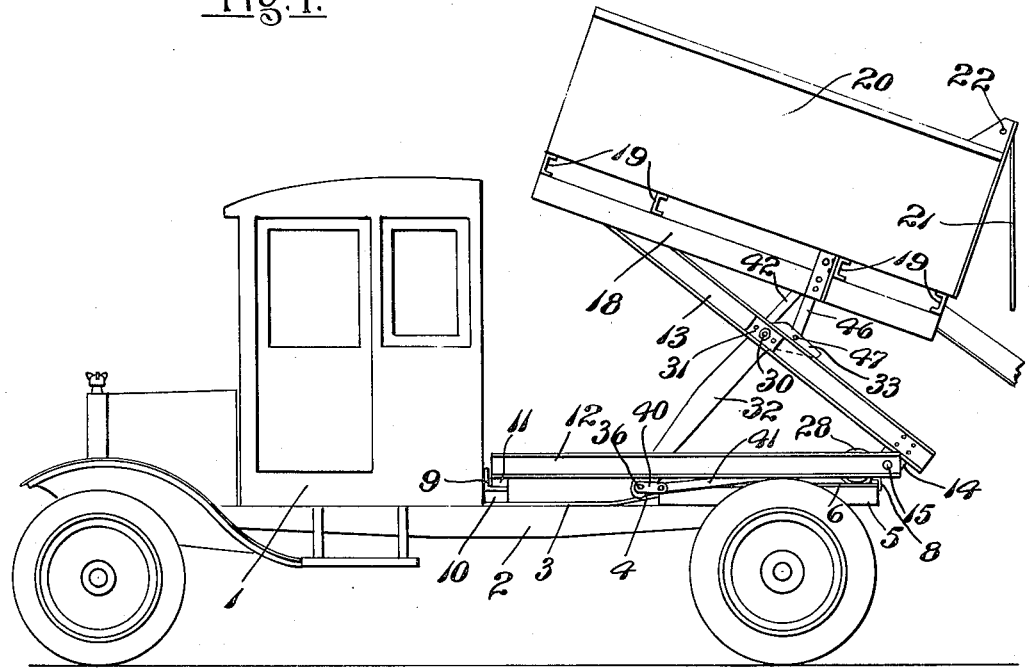
Fig. 2 is a like view showing the body in its extreme upper tilted position.
Figure 7:
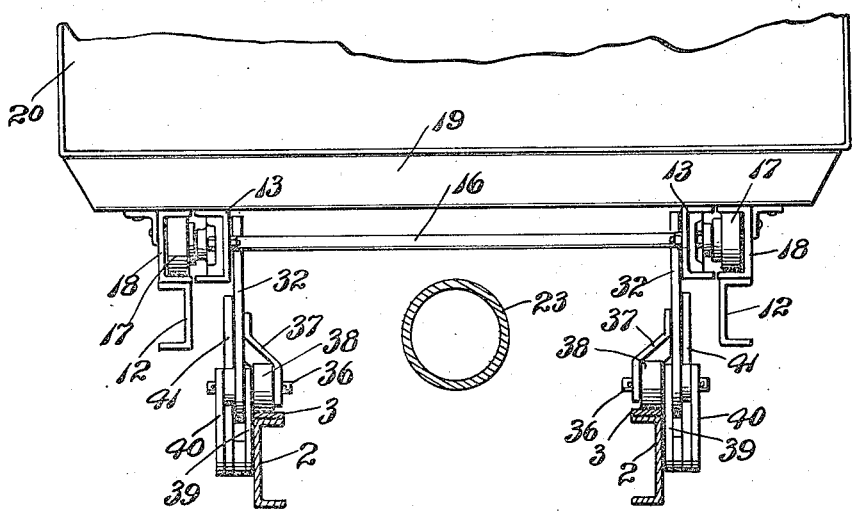
Figure 8:
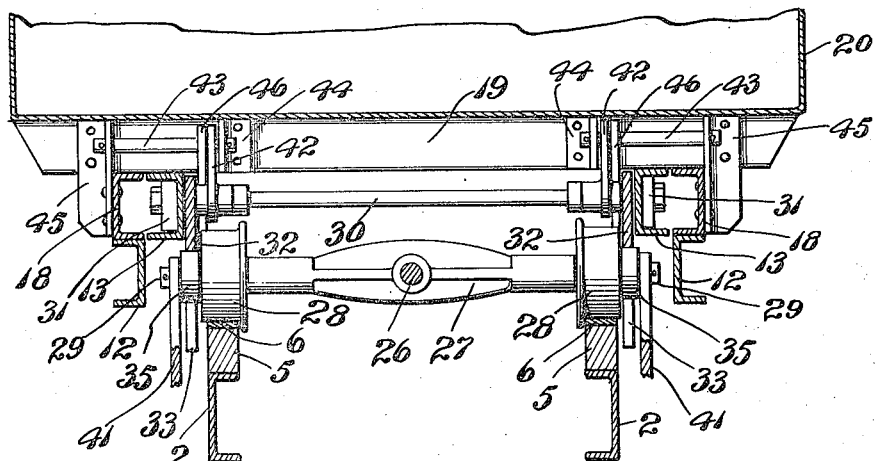

Figs. 7 and 8 are vertical sections taken on the planes of lines 7—7 and 8—8, of Fig. 4.

Figure 9:
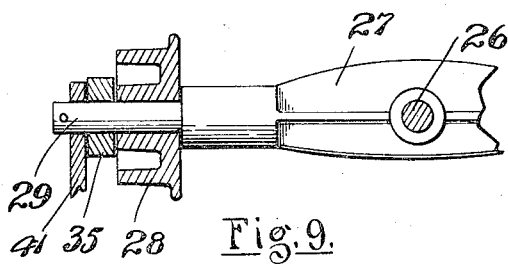

Fig. 9 is a fragmentary enlarged section showing a detail of structure pertaining to the cross arm and rollers mounted thereon forming one part of the structure.

Fig. 10 is a view similar to Fig. 5, showing the structure adapted for simple tilting of the body without elevating the same.

Fig. 11 is a fragmentary perspective view showing the connection and arrangement of elements at the front ends of the cam levers forming one part of the structure; and Fig. 12 is a like view at the opposite rear end of each cam lever.

Like reference characters refer to like parts in the different figures of the drawings.

The motor truck 1 on which the dumping body is to be mounted may be of conventional construction, including chassis side frame members 2 which, at their rear ends are connected by a cross member 2ª. On the upper side of each frame member 2, a track 3 of flat bar metal is secured, the front end of the track being immediately back of the cab of the truck. Each track extends to the rear lying flat against the upper side of its frame member 2 for a distance and is then bent to extend upwardly and to the rear at an angle, as indicated at 4, terminating in a short horizontal rear end section 3ª which joins with the front end of a bar 5 lying directly above each frame member 2 and at its rear end extending a distance back of the cross member 2ª. Bars 5 are finished at their upper sides with tracks 6 of flat bar metal, as shown. A cross bar 7 of metal lies between the front ends of the bars 5 and a rear cross bar 8 of angle iron connects the rear ends of bars 5.

A front cross bar 9 of angle iron form is located at the front ends of the tracks 3, being spaced a distance above the same by blocks 10. Other blocks 11 lie above the horizontal leg of the angle bar 9, the upper sides of the said blocks 11 and upper side of the back bar 8 being in the same horizontal plane. Side bars 12 of channel form lie one at each side of the truck being located farther out than the side chassis frame members and supported at their ends by the bars 8 and 9, being securely fastened thereto.

A channel bar 13 lies above each side bar 12 and inwardly therefrom, being located parallel thereto. At the rear end of each bar 13 a plate 14 is permanently secured and passed downwardly along the inner side of the adjacent bar 12, a rod 15 passing through said bars 12 and plates 14 thereby making a pivotal connection between the rear ends of the bars 12 and 13. At the front ends of the channel bars 13 a rod or shaft 16 is located, the same passing through the webs of the two channels 13 and carrying a roller 17 at each end which is received in a third channel bar 18, one of which is located parallel to and directly over the side bars 12. In the lower horizontal position of the truck body, the channel bars 18 bear for their full length on the side bars 12. A number of cross sills 19 lie above and are connected to the bars 18 and on these sills the truck body 20 is secured, the same being of conventional construction of sheet metal, preferably, and having a rear swinging gate 21 pivotally mounted at its upper edge on a rod 22 so as to swing outward at its lower end when the body is tilted, allowing the contents carried by the body to escape.

On the cross bar 9 of the under frame and the bar 7, a cylinder 23 is located, being secured at its front end to the bar 9 by a suitable connection between the bar and the head 24 of the cylinder, a loop 25 passing around the cylinder at its rear end and connecting it permanently with the cross bar 7. A piston in the cylinder has a piston rod 26 connected thereto, passing out at the rear end of the cylinder. A cross head 27 is attached to the outer end of the piston rod. A roller 28 is rotatably mounted at each end of the cross head on an arbor 29 of reduced diameter, said rollers lying above and bearing against the tracks 6 before described.

A rod 30 is located between the channel bars 13 and passes through the webs of the same, having connection at its ends to blocks 31 located between the flanges of the channels. This rod is located substantially midway between the ends of the channel bars 13. The rod passes through two cam levers 32, one of which is located at the inner side of each channel bar 13. Each cam lever is of the form shown in Figs. 4, 5, 6 and 10, at its rear end having a substantially right-angular extension or part 33, the under side edge 34 of which is cut on an incline making a wedge-like cam, the purpose of which will later appear. On each arbor 29, alongside each roller 28 a second smaller roller 35 is rotatably mounted and in the lower horizontal position of the body, as shown in Fig. 4, the roller 35 lies under the lever 32 and in the curve formed at the junction of the under edges of the lever 32 and its extension 33. On any rearward movement of the cross head 27, the rollers 35 ride under and bear against the inclined wedge cam edge 34 of said extension 33.

At the front end of each cam lever 32 a pin 36 is passed horizontally therethrough, a reinforcing bracket 37 having attachment at one end to the lever 32 and the pin passing through the free end of the bracket. A roller 38 is rotatably mounted on each pin and located above to bear against the track 3. Two links 39 and 40 depend from the pin 36, as shown in Fig. 11, being properly spaced by collars, and at their lower ends are connected by a second pin, a connecting bar 41 being connected at its front end to the second pin. There are two of the connecting bars 41, the same extending to the rear and connecting at their rear ends to the two arbors 29 which pass through the ends of the bars 41.

A link bar 42 is pivotally mounted on the rod 30 adjacent each cam lever 32, extending therefrom to a rod 43 which passes through the other end of the bar. Rod 43 is mounted on and between two brackets 44 and 45 secured to one of the cross sills 19, as shown in Figs. 1, 2, 3 and 8. A second link bar 46 is pivotally mounted at its rear upper end on each rod 43 and may be connected to the part 33 of the cam lever 32 by a pin 47 adapted to be passed through holes 48 and 49 (see Fig. 10) in said part 33 and the bar 46, respectively. The hole 48 is located a distance from the rod 30 and when the bars 46 are connected to the parts 33, the bars 42, 46 and parts 33 make a triangle, rigid against displacement, and in effect, there is made a rigid extension to the lever 32.

With the construction as described and shown, the operation may be outlined as follows: The piston in the cylinder is actuated by a liquid, preferably, oil which may be pumped through a suitable pump by the engine of the motor truck, this not being shown as it is well known and old in the art of dumping motor truck bodies. The movement of the piston and its attached piston rod 26 carries the cross head 27 to the rear, rollers 28 moving over the tracks 6 and the smaller rollers 35 riding under the inclined edges 34 of the parts 33. As a result of this movement, with the link bars 46 connected to the parts 33 of the cam levers 32, the parts of the construction take the position shown in Fig. 5, the rear ends of the cam levers 32 being elevated with a consequent tilting of the channel bars 13 about the pivot rod 15 and an elevation of the rear ends of the side channels 18 and the body 20 carried thereon about the axis of the rod 16. If the link bars 46 are disconnected, the parts take the position shown in Fig. 10, the body being tilted about the rod 15 with no elevation of the rear end of the body.

During the rearward movement of the cross head 27 to the position shown in Figs. 5 or 10, the connecting bars 41 are also moved to the rear carrying the links 39 and 40 to an inclined position as shown in such position and bringing the spacing collar between the lower ends of the links against the under edges of the cam levers 32. Further movement of the cross head 27 to the rear carrying the connecting bars 41 with them serves to draw the cam levers as a whole rearwardly, the rollers 38 running over the tracks 3. The channels 13 are further elevated about the pivot rod 15 and if the link bars 46 are disconnected from the parts 32, the body 20 is tilted to correspond, the under side of the body paralleling the length of the channel bars 13. If the link bars 46 are connected to said parts 33, the tilting of the body is accompanied by an elevation of the rear end of the body and a forward movement of the body as a whole with respect to the channel bars 13 and the motor truck below said body. This follows by reason of the fact that the bars 42 and 46 being in effect a rigid continuation of the levers 32, and the levers turning about the axis of rod 30, swings the said bars both upwardly and forwardly about the axis of said rod 30, the forward movement of the body being allowed by the travel of the channels 18 on the rollers 17. The forward movement of the channels 18 and the body attached thereto serves to keep the load forward far enough that there will be no danger of backward overbalancing of the truck. At the final step of the movement, the rollers 38 ride on the upwardly inclined portions 4 of the tracks 3, whereby the last portion of the movement gives a greater tilting to the channels 13 and to the body so that the loose contents carried in the body will more readily move by gravity to the rear, said final step of the movement resulting in little or no elevation of the rear end of the body or forward movement thereof.

The construction described, it will be evident, is adapted for either direct body tilting, or body tilting accompanied by an elevation of the body as a whole to a considerably higher position than what it normally occupies. And the change from one to the other is accomplished by merely disconnecting or connecting the bars 46 from or to the parts 33 in a very simple manner. The construction is strong and durable and amply capable of withstanding the severe strains to which it is subjected in service. Installed on a truck, the mechanism is more or less concealed when the body is in lower position. The claims appended define the invention which is to be considered as comprehensive of all forms of structure coming within their scope.

I claim:

1. In combination with a motor vehicle having spaced apart chassis side frame members, a track located at the upper side of each member having the back portion thereof bent upwardly at an incline, a bar extending in alinement with the said track, located above and extending back of the rear end of each frame member, a second track at the upper side of each bar, a cross member connecting the rear ends of said bars, a second cross member located at the front ends of the first tracks, two side bars secured in spaced apart relation on and connected to said cross members, two channel members located one adjacent and above each of the side bars and within the inner sides thereof, means pivotally connecting said channel members at their rear ends to said side bars, two additional channel bars located one directly above each side bar and alongside said first channel members, a shaft passing through the front ends of said first channel members, rollers on the ends of the shaft fitting in the said additional channel bars, cross sills above and connecting the said additional channel bars, a body carried on the sills, a cylinder located horizontally between the front portions of the side bars, a piston rod extending to the rear therefrom, a cross head at the end of the piston rod, rollers one on each end of the cross head and running on said second mentioned tracks an additional roller at each end of the cross head adjacent each of the first rollers, a rod secured at its ends to and lying between the first named channel members, a cam lever positioned adjacent each of said first named channel members and pivotally mounted on said rod, each of said cam levers including a main portion extending from the rod forwardly and a part extending from the rear end of the main portion downwardly substantially at right angles to said main portion and having a lower edge cut with a downward and rearward incline, said cam levers normally bearing against the said additional rollers on the cross head, a bracket at the front end of the main portion of each cam lever having its front end spaced from the lever, a pin passing through each cam lever and bracket, a roller on the pin bearing on the first named tracks, links depending from each pin, a connecting bar attached to the lower ends of said links extending to the rear and connecting with each end of the cross head, a bar located adjacent each cam lever and pivotally mounted at its front end on the rod between the cam levers, rods carried by the body at the under side thereof with which the rear ends of said bars have pivotal connection, two additional bars pivotally mounted at their rear ends, one on each rod, and means for detachably connecting the said additional bars to the cam levers at their front ends at points a distance below the said rod lying between the cam levers.

2. In combination with a motor vehicle having spaced apart chassis frame members, a track located at the upper side of each member having its rear portion bent upwardly at an incline, a bar extending in alinement with each track, located above and extending back of the rear end of each frame member, a second track at the upper side of each bar, a cross member connecting the rear ends of said bars, a second cross member located at the front ends of the first tracks, two side bars secured in spaced apart relation on and connected to the cross members, two channel members located one adjacent and above each of the side bars and within the inner sides thereof, means pivotally connecting said channel members at their rear ends to the rear ends of the side bars, two additional channel members located one directly above each side bar and alongside said first channel members, a shaft passing through the front ends of the first channel members, rollers on the ends of the shaft fitting in said additional channel members, a body carried on the additional channel members, a cylinder located between the front portions of the side bars, a piston rod therein extending to the rear, a cross head on the rear end of the piston rod, rollers one on each end of the cross head bearing on said second mentioned tracks, a second roller mounted at each end of the cross head, a cam lever located adjacent each of the first named channel members and pivotally connected therewith at a point between the ends of the channel members, said cam lever including a main portion extending forwardly from the pivot and a part extending downwardly from said pivot, said parts having downwardly and rearwardly inclined lower edges to bear against the second rollers on the cross head, a roller mounted at the front end of each cam lever to bear on the first named tracks, links pivotally depending from the front end of each cam lever, a connecting bar pivotally connected to the lower ends of said links, one for each cam lever, and connected at its rear end with an end of the cross head, a bar pivotally connected with each cam lever at the rear portion thereof and extending rearwardly therefrom toward the body, means for pivotally connecting the rear end of said bar with the body, an additional bar pivotally connected at its rear end to the body and lying alongside each of the first of said bars, and means for detachably connecting the additional bars at their front ends to the respective cam levers at points distant from the connection of the first bars thereto.

3. In combination with a motor vehicle having spaced apart chassis frame members, a bar attached to and located above the rear portion of each of the frame members and extending back of the rear end thereof, a cross member connecting the rear ends of the bars, a second cross member located a distance in front of the front ends of said bars, two side bars secured in spaced apart relation on and connected to the cross members, two channel members located one adjacent and above each side bar and within the inner sides thereof, means pivotally connecting the channel bars at their rear ends to the rear ends of the side bars, two additional channel members located one directly above each side bar and alongside the first channel members, a shaft passing through the front ends of the first channel members, rollers on the ends of the shaft running in the additional channel members, a body carried on the additional channel members, a cross head located transversely above and between the frame members, a roller on each end of the cross head bearing against the upper sides of the first named bars, a second roller at each end of the cross head, means for moving the cross head rearwardly, a cam lever located adjacent each of the first channel members and pivotally connected thereto at a point between the ends of said channel members, each of the cam levers including a main portion extending forwardly from the pivot and a part extending downwardly therefrom and having a downwardly and rearwardly inclined under edge to bear against the adjacent second roller on the cross head, a roller mounted at the front end of each cam lever and bearing against the upper side of the adjacent chassis frame member, links pivotally depending from the front end of each cam lever, a connecting bar pivotally connected at its front end to the lower ends of the links on each cam lever and connected at its rear end to an end of the cross head.

4. A construction containing the elements in combination defined in claim 3, combined with a bar pivotally connected at its front end to each cam lever at the rear portion thereof and extending toward the body, means pivotally connecting the rear end of said bar to the body, a second bar associated with each of the said bars connected to the cam levers, said second bars having pivotal connection at their rear ends to the body, and means for detachably connecting said second bars to the cam levers at points distant from the points of connection of the other bars to the cam levers.

5. In combination with a motor vehicle having spaced apart chassis frame members, front and rear cross members carried by the chassis frame members, two side bars secured in spaced apart relation on and connected to the cross members, two channel members located one adjacent and above each side bar and within the inner sides thereof, means pivotally connecting the channel bars at their rear ends to the rear ends of the side bars, two additional channel members located directly over each side bar and alongside the first channel members, a shaft passing through the front ends of the first channel members, rollers on the ends of the shaft running in the additional channel members, a body carried on the additional channel members, a horizontally located cylinder between the chassis frame members, a piston rod extending from the cylinder, a cross head on the end of the rod, rollers on the ends of the cross head to move lengthwise of the chassis frame members, and means interposed between the cross head, the first channel members and the body for tilting the said first channel members about the axis of their pivotal connection to the side bars and for simultaneously elevating the rear ends of the additional channel members and the rear end of the body attached thereto on rearward movement of the cross head.

6. In combination with a motor vehicle having a chassis with side members, a pair of spaced apart side bars carried on the chassis in spaced apart relation parallel to the said side members of the chassis, two channel members located above and paralleling said side bars, means pivotally connecting the channel members at their rear ends to said side bars, two additional channel members located one at the outer side of each of the first channel members, a shaft passing through the front ends of the first channel members, rollers on the ends of the shaft running in the channels of the second channel members, a body carried by and above the additional channel members, and means for tilting the first channel members upwardly about the axis of their pivotal connection to the side bars and simultaneously elevating the rear ends of the additional channel members about the axis of the shaft and moving said additional channel members and attached body forward on the rollers.

7. In combination, a support, two spaced apart parallel side bars connected with the support, two channel members located in parallelism with the side bars and pivotally connected at their rear ends to the rear ends of the side bars, two additional channel members located alongside the first channel members, rollers mounted one at the front end of each of the first channel members and running in the channels of the additional channel members, a body carried on and above the additional channel members, and means operated pneumatically for tilting the first channel members upwardly about the axis of their pivotal connection to the side bars and simultaneously elevating the additional channel members and attached body at their rear ends and moving said additional channel members forwardly on the rollers.

8. In combination with a motor truck having a chassis frame, a truck body mounted thereon for tilting movements, tracks, a cross head, rollers on the ends of the cross head to traverse said tracks, said tracks being carried on the chassis frame, other rollers on the cross head, means for moving the cross head rearwardly over the tracks, means acted upon by said other rollers for partly lifting the front end of the body by a wedging action of the other rollers against said means on the first portion of the movement of the cross head to the rear, and means for giving an additional upward tilting movement to the front end of the body on further rearward movement of the cross head after leaving the wedging means.

9. In combination with a motor truck having a chassis frame, a truck body mounted thereon for tilting movements whereby the front end of the body is elevated simultaneously with the rear end thereof but to a greater height, tracks on the frame, a cross head, rollers on the ends of the cross head to traverse the tracks, other rollers on the cross head, pneumatic means for moving the cross head rearwardly, means acted upon by said other rollers for elevating the body at both its front and rear ends by a wedging action of said other rollers against said means during the initial portion of the rearward movement of the cross head, and means for effecting an additional upward movement of the body at both its front and rear ends on further rearward movement of the cross head after termination of the wedging lift of the body.

10. In combination with a motor truck having a chassis frame, a truck body mounted thereon for tilting movements and having means interposed between the body and frame for elevating the front end of the body about a rearwardly positioned axis and the rear end of the body about a forwardly positioned axis, a horizontally positioned cylinder under the body, a piston rod extending to the rear therefrom, a cross head on the piston rod, rollers on the cross head running on the chassis frame, means connected with the mounting for the truck body having inclined cam portions, other rollers on the cross head to bear against the said inclined portions and elevate the same on rearward movement of the cross head, and devices attached to said means and connected with the body for elevating the rear end of the truck body on elevation of said means.

11. In combination with the frame of a vehicle and a body located thereabove, means for mounting the body on the frame for tilting movements thereof about a rearwardly positioned axis, spaced tracks carried by the frame, devices associated with the body and disposed between the body and tracks, unitary means movable along said tracks and acting against said devices to tilt the body by a wedging action, and additional means connected with said unitary means for further tilting the body after the completion of the tilting movement caused by said wedging action.

12. In combination with the chassis side frame members of a truck, and a body located above the same, means for mounting the body on said members for tilting the body about a rearwardly positioned axis, tracks carried on the chassis frame members, devices associated with the body disposed between the body and tracks, rollers co-axial one with another to run on said tracks and bear against said devices to tilt the body when the rollers are moved along said tracks, means for moving the rollers along the tracks, and additional means movable with the rollers after the same leave said devices for further tilting the body.

13. In combination with the frame of a vehicle and a body located thereabove, means for mounting the body on the frame for tilting movements of the front end of the body about a rearwardly positioned axis, and elevation of the rear end of the body about a forwardly positioned axis, tracks on the frame, devices having inclined cam edges associated with the body and located below the same, and means movable along the tracks and engaging said devices to simultaneously elevate both ends of the body and elevate the front end of the body to a greater height than the rear end thereof.

In testimony whereof I affix my signature.

EDWARD R. BARRETT.